US012623495B2

(12) United States Patent     (10) Patent No.: US 12,623,495 B2

Wischt, Jr. et al.     (45) Date of Patent: May 12, 2026

(54) DIRECTIONAL INTERLOCKING SIPE AND/OR SLOT

(71) Applicant: BRIDGESTONE AMERICAS TIRE OPERATIONS, LLC, Nashville, TN (US)

(72) Inventors: Paul J. Wischt, Jr., Barberton, OH (US); David M. Severyn, Uniontown, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 18/701,764

(22) PCT Filed: Oct. 7, 2022

(86) PCT No.: PCT/US2022/077734

§ 371 (c)(1),
(2) Date: Apr. 16, 2024

(87) PCT Pub. No.: WO2023/064704

PCT Pub. Date: Apr. 20, 2023

(65) Prior Publication Data

US 2024/0408919 A1     Dec. 12, 2024

Related U.S. Application Data

(60) Provisional application No. 63/256,542, filed on Oct. 16, 2021.

(51) Int. Cl.
*B60C 11/12*     (2006.01)

(52) U.S. Cl.
CPC ...... *B60C 11/1218* (2013.01); *B60C 11/1236* (2013.01); *B60C 2011/1213* (2013.01)

(58) Field of Classification Search
CPC ..... B60C 11/11; B60C 11/12; B60C 11/1204; B60C 11/1213; B60C 11/1218
See application file for complete search history.

(56) References Cited

U.S. PATENT DOCUMENTS

| | | | |
|---|---|---|---|
| 2011/0155293 A1 | 6/2011 | Berger et al. | |
| 2012/0132337 A1 | 5/2012 | Toulemont et al. | |
| 2017/0166015 A1 * | 6/2017 | Christenbury ...... | B60C 11/1218 |

FOREIGN PATENT DOCUMENTS

| | | | |
|---|---|---|---|
| EP | 1555142 A2 | 7/2005 | |
| EP | 3145730 B1 * | 7/2020 ........... | B60C 11/124 |

(Continued)

OTHER PUBLICATIONS

Chatani. JP2020124991A. 2020. ESpacenet Machine Translation. (Year: 2025).*

(Continued)

*Primary Examiner* — Cedrick S Williams

(57) ABSTRACT

In one aspect, a tire is provided, the tire comprising: a tread portion comprising at least one of a tread rib or a tread block, a sipe included in the tread rib or the tread block, wherein the sipe includes a central s-shaped portion located axially between opposing laterally extending straight portions, wherein the sipe includes a plurality of key portions angled in a first circumferential direction, wherein the sipe includes a plurality of return portions angled in a second circumferential direction, wherein the return portions connect the key portions, and wherein a first key portion intersects a tread surface of the tread rib or the tread block. The plurality of key portions are angled at an angle KA, the plurality of return portions are angled at an angle RA, and the ratio of the angle KA to the angle RA is at least 5:1.

19 Claims, 12 Drawing Sheets

(56) References Cited

FOREIGN PATENT DOCUMENTS

| | | | |
|----|--------------|-----|--------|
| JP | 10-181315 | A | 7/1998 |
| JP | 2013159143 | A | 8/2013 |
| JP | 2020124991 | A * | 8/2020 |
| WO | 2014/064936 | A1 | 9/2016 |

OTHER PUBLICATIONS

International Search Report and Written Opinion issued in PCT/US22/77734, dated Jan. 25, 2023 (10 pages).
International Preliminary Report on Patentability issued in PCT/US22/77734, dated Apr. 16, 2024 (7 pages).
Notification of reasons for refusal issued in JP2024-522143 on Apr. 22, 2025.

* cited by examiner

DIRECTIONAL INTERLOCKING SIPE AND/OR SLOT

CROSS-REFERENCE TO RELATED APPLICATIONS

This application claims priority from U.S. Provisional Patent Application No. 63/256,542, filed on Oct. 16, 2021, which is incorporated by reference herein in its entirety.

BACKGROUND

Tires are often designed to optimize performance in a variety of road conditions. For example, a tire may include tread features that are designed to optimize performance in snow-covered/icy road conditions and dry road conditions.

Obtaining traction in snow and ice may be achieved by providing "biting edges" in the tread of the tire. These "biting edges" are often in the form of sipes or slots. However, too many sipes or slots can lead to a loss of tread block or rib stiffness, which may be undesirable in the performance optimization of the tire, particularly in dry roadway conditions.

Accordingly, what is needed is a tire tread feature to balance snow and ice traction with dry roadway traction.

SUMMARY

In one aspect, a tire is provided, the tire comprising: a tread portion comprising at least one of a tread rib or a tread block, a sipe included in the tread rib or the tread block, wherein the sipe includes a central s-shaped portion located axially between opposing laterally extending straight portions, wherein the sipe includes a plurality of key portions angled in a first circumferential direction, wherein the sipe includes a plurality of return portions angled in a second circumferential direction, wherein the return portions connect the key portions, and wherein a first key portion intersects a tread surface of the tread rib or the tread block.

In another aspect, a tire is provided, the tire comprising: a tread portion comprising at least one of a tread rib or a tread block, a sipe included in the tread rib or the tread block, wherein the sipe includes a plurality of key portions angled in a first circumferential direction at an angle KA from the circumferential direction tangential to a tread surface, wherein the sipe includes a plurality of return portions angled in a second circumferential direction at an angle RA from the circumferential direction tangential to the tread surface, wherein the return portions connect the key portions, wherein a first key portion intersects the tread surface of the tread rib or the tread block, and wherein the ratio of the angle KA to the angle RA is at least 5:1.

In another aspect, a tire sipe blade is provided, the tire sipe blade comprising: an upper mold insertion portion, a lower sipe forming portion including: a plurality of key portions angled in a first circumferential direction at an angle KA, a plurality of return portions angled in a second circumferential direction at an angle RA, wherein the return portions connect the key portions, wherein a first key portion connects to the upper mold insertion portion, and wherein the ratio of the angle KA to the angle RA is at least 5:1.

BRIEF DESCRIPTION OF THE DRAWINGS

The accompanying figures, which are incorporated in and constitute a part of the specification, illustrate various example aspects, and are used merely to illustrate various example aspects. In the figures, like elements bear like reference numerals.

DETAILED DESCRIPTION

Axes and planes described herein are illustrated in the figures and include a circumferential axis C oriented in the circumferential direction of the tire, a radial axis R oriented in the radial direction of the tire, and an axial axis A oriented in the axial direction of the tire.

Figure 1:
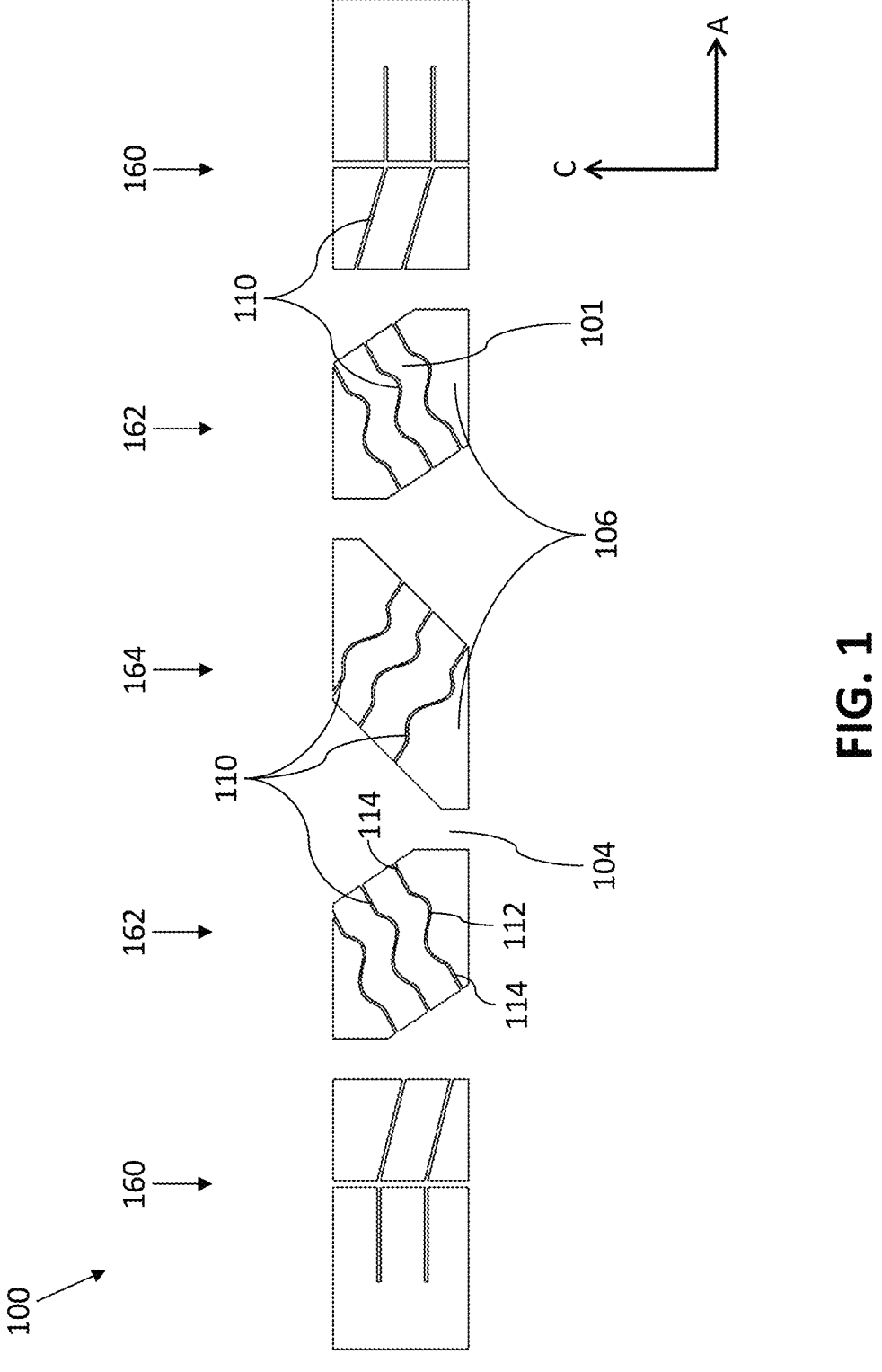
FIG. 1 illustrates a plan view of a tire tread 100 having a tread block 106 with a directional interlocking sipe and/or slot 110.

FIG. 1 illustrates a tire tread 100 having a tread block 106 with a directional interlocking sipe and/or slot 110. Tread 100 includes a tread surface 101, which is the radially outer surface of tread 100 that contacts the driving surface. Tread 100 may include a plurality of blocks 106 oriented in block rows defined by one or more circumferential groove 104, including for example, shoulder rows 160, intermediate rows 162, and one or more center row 164. Alternatively, tire tread 100 may include ribs (defined by one or more circumferential grooves 104) instead of independent blocks 106, the ribs being oriented in the aforementioned shoulder, intermediate, and center orientations.

Tire tread 100 includes one or more directional interlocking sipes and/or slots 110. Sipes and/or slots 110 may include a central s-shaped portion 112 oriented axially between laterally extending straight portions 114. Sipes and/or slots 110 may include only straight portions 114, as illustrated for example only in shoulder rows 160 of the example tire tread 100. Tire tread 100 may include sipes and/or slots 110 of each arrangement (with a central s-shaped portion 112, or without a central s-shaped portion 112). It is contemplated that these alternative sipe and/or slot arrangements 110 may be contained in differing block rows 160, 162, 164 as illustrated, or may be intermixed within the same block row 160, 162, 164 or even the same block 106.

For brevity and readability, the term "sipe" as used herein is intended to refer a sipe and/or slot, which may refer to any small incision within a tread block or rib and/or any small lateral groove circumferentially separating tread blocks or breaking up a tread rib. The use of the term "sipe" is not intended as excluding slots as used herein.

FIGS. 2A-2F illustrate various possible aspects of sipe blade 230 for forming a directional interlocking sipe and/or slot, including for example sipe and/or slot 110 illustrated in FIG. 1.

Sipe blade 230 includes an upper mold insertion portion 232, and a lower sipe forming portion 234.

Upper portion 232 includes a centerline CL. Upper portion 232 includes a circumferential tread surface sipe width TSW, which is the width of the sipe (e.g., sipe and/or slot 110) at the tread surface (e.g., tread surface 101). Width TSW may be about 0.60 mm. Width TSW may be 0.60 mm. Width TSW may be between about 0.50 mm and about 0.70 mm. Width TSW may be between 0.50 mm and 0.70 mm. Width TSW may be between about 0.40 mm and about 0.80 mm. Width TSW may be between 0.40 mm and 0.80 mm. Width TSW may be between about 0.30 mm and about 0.90 mm. Width TSW may be between 0.30 mm and 0.90 mm.

Lower portion 234 includes a plurality of key portions 236. A first key portion 236 is radially inward of and directly connected to upper portion 232. Each key portion 236 is connected to another key portion 236 by a return portion 238.

In one aspect, lower portion 234 includes at its radially outermost position (immediately radially inward of upper portion 232) a first key portion 236, with a first return portion 238 extending radially inwardly therefrom, a second key portion 236 extending radially inwardly from the first return portion 238, with a second return portion 238 extending radially inwardly therefrom, and finally a third key portion 236 extending radially inwardly from the second return portion 238.

Each key portion 236 is angled at an angle KA from the circumferential direction, measured tangential to the tread surface (e.g., tread surface 101). Each key portion 236 is angled in the same direction (e.g., in a first circumferential direction). Angle KA may be about 60 degrees. Angle KA may be 60 degrees. Angle KA may be between about 55 degrees and about 65 degrees. Angle KA may be between 55 degrees and 65 degrees. Angle KA may be between about 50 degrees and about 70 degrees. Angle KA may be between 50 degrees and 70 degrees. Angle KA may be between about 45 degrees and about 75 degrees. Angle KA may be between 45 degrees and 75 degrees.

Each return portion 238 is angled at an angle RA from the circumferential direction, measured tangential to the tread surface (e.g., tread surface 101). Each return portion 238 is angled in the same direction (e.g., in a second circumferential direction), opposite that of each key portion 236 (e.g., the first circumferential direction). Angle RA may be about 11 degrees. Angle RA may be 11 degrees. Angle RA may be between about 9 degrees and about 15 degrees. Angle RA may be between 9 degrees and 15 degrees. Angle RA may be between about 7 degrees and about 19 degrees. Angle RA may be between 7 degrees and 19 degrees. Angle RA may be between about 5 degrees and about 23 degrees. Angle RA may be between 5 degrees and 23 degrees.

Wherein the ratio of angle KA to angle RA is at least 5:1. Wherein the ratio of angle KA to angle RA is between 5:1 and 6:1.

Each key portion 236 includes a width KW. Width KW is measured transversely (90 degrees from) the longitudinal direction of each key portion 236. Width KW may be about 0.30 mm. Width KW may be 0.30 mm. Width KW may be between about 0.25 mm and about 0.40 mm. Width KW may be between 0.25 mm and 0.40 mm. Width KW may be between about 0.20 mm and about 0.50 mm. Width KW may be between 0.20 mm and 0.50 mm. Width KW may be between about 0.15 mm and about 0.60 mm. Width KW may be between 0.15 mm and 0.60 mm.

Each return portion 238 includes a width RW. Width RW is measured transversely (90 degrees from) the longitudinal direction of each return portion 238. Width RW may be about 0.40 mm. Width RW may be 0.40 mm. Width RW may be between about 0.35 mm and about 0.50 mm. Width RW may be between 0.35 mm and 0.50 mm. Width RW may be between about 0.30 mm and about 0.60 mm. Width RW may be between 0.30 mm and 0.60 mm. Width RW may be between about 0.25 mm and about 0.70 mm. Width RW may be between 0.25 mm and 0.70 mm.

The ratio of the width KW to the width RW may be 3:4.

First key portion 236 joins first return portion 238 at a first vertex that is a radial height KH1 from the tread surface (the junction between upper portion 232 and lower portion 234), such as tread surface 101.

Figure 2A:
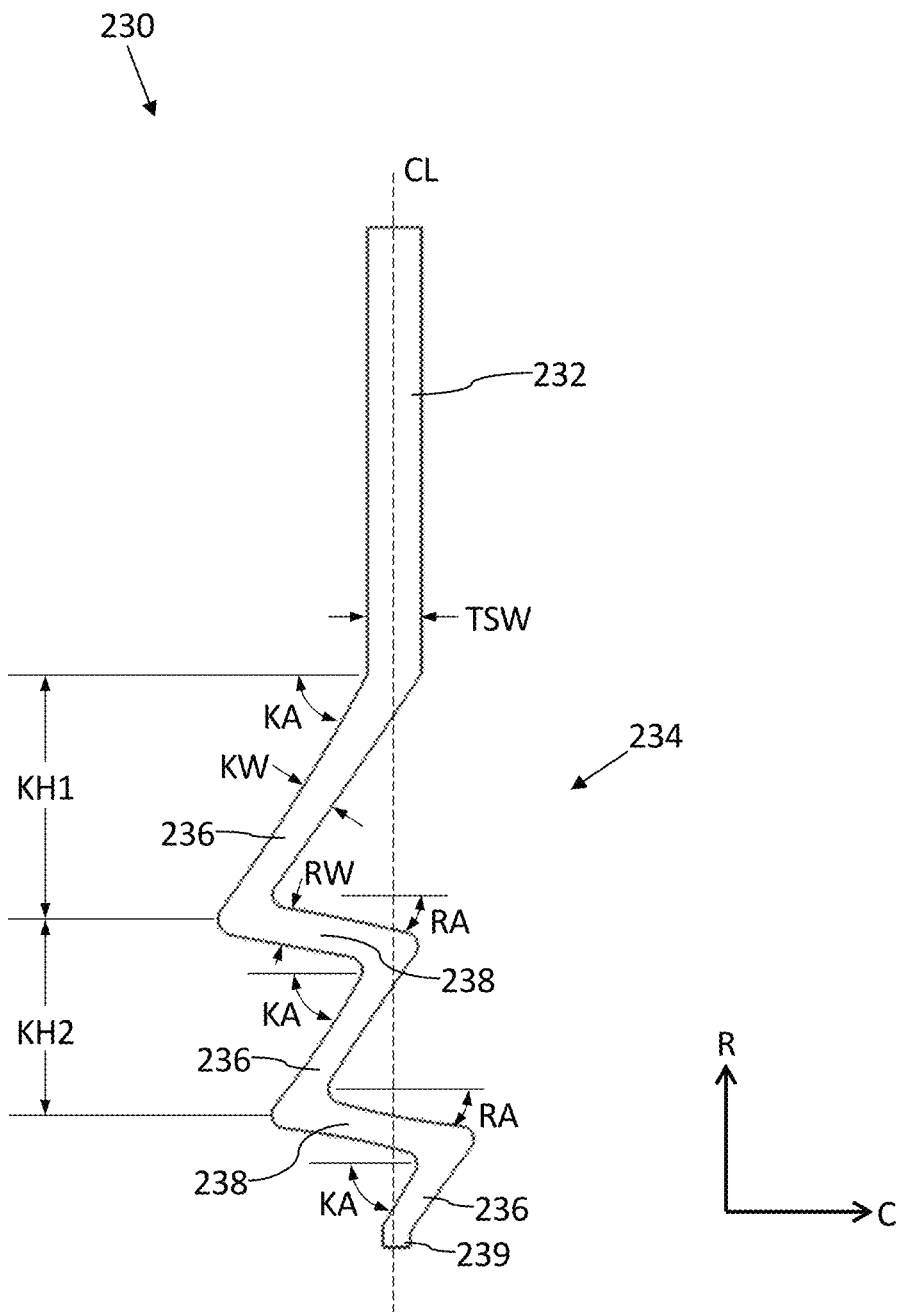
FIG. 2A illustrates an elevation sectional view of a sipe blade 230 for forming a directional interlocking sipe and/or slot.

In the aspect illustrated in FIG. 2A, height KH1 may be about 2.76 mm. Height KH1 may be 2.76 mm. Height KH1 may be between about 2.50 mm and about 3.00 mm. Height KH1 may be between 2.50 mm and 3.00 mm. Height KH1 may be between about 2.00 mm and about 3.50 mm. Height KH1 may be between 2.00 mm and 3.50 mm. Height KH1 may be between about 1.50 mm and about 4.00 mm. Height KH1 may be between 1.50 mm and 4.00 mm. FIG. 2A may be, for example, a sipe blade 230 for forming a sipe and/or slot in a shoulder rib or shoulder block row (e.g., shoulder row 160).

Figure 2B:
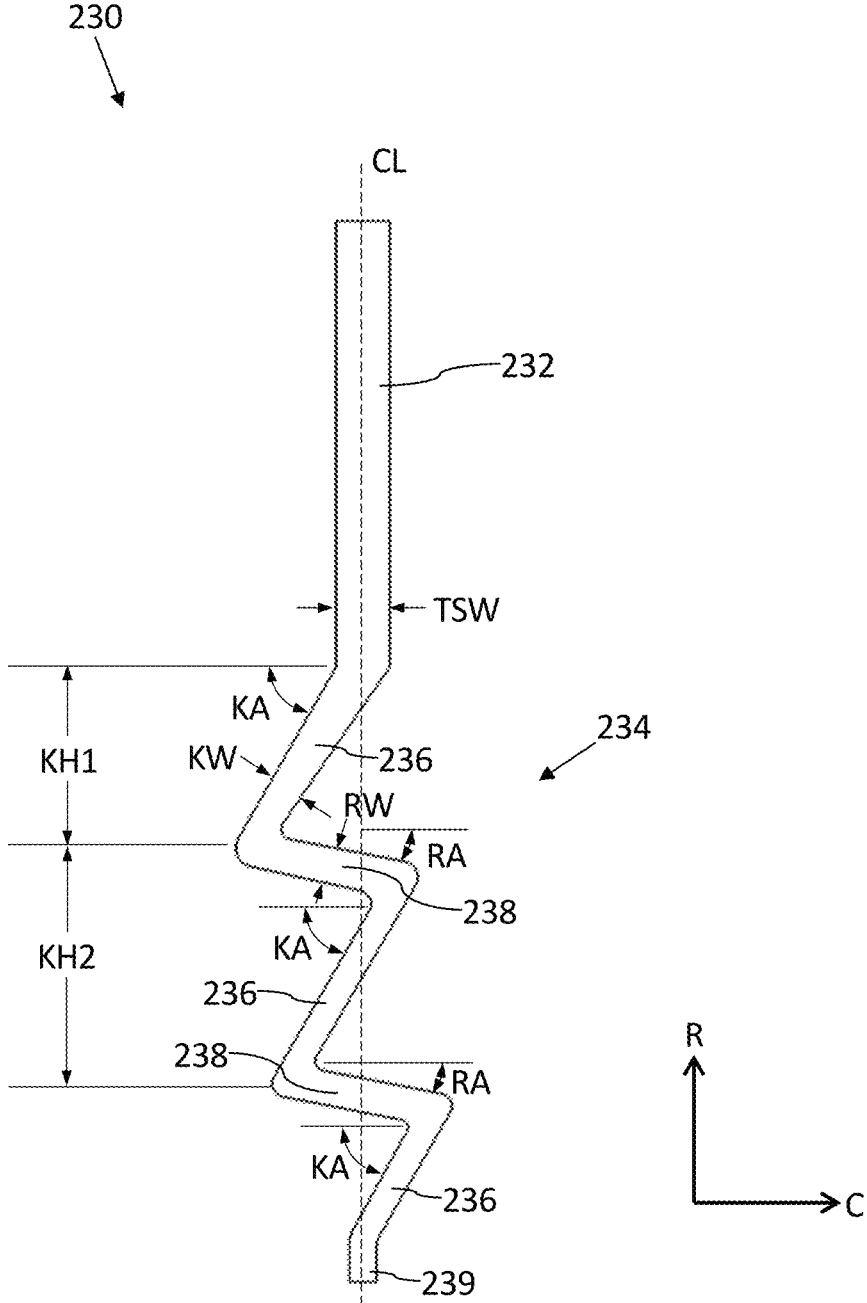
FIG. 2B illustrates an elevation sectional view of sipe blade 230 for forming a directional interlocking sipe and/or slot.

In the aspect illustrated in FIG. 2B, height KH1 may be about 2.17 mm. Height KH1 may be 2.17 mm. Height KH1 may be between about 2.00 mm and about 2.50 mm. Height KH1 may be between 2.00 mm and 2.50 mm. Height KH1 may be between about 1.50 mm and about 3.00 mm. Height KH1 may be between 1.50 mm and 3.00 mm. Height KH1 may be between about 1.00 mm and about 3.5 mm. Height KH1 may be between 1.00 mm and 3.50 mm. FIG. 2B may be, for example, a sipe blade 230 for forming a sipe and/or slot in an intermediate rib or intermediate block row (e.g., intermediate row 162).

Figure 2C:
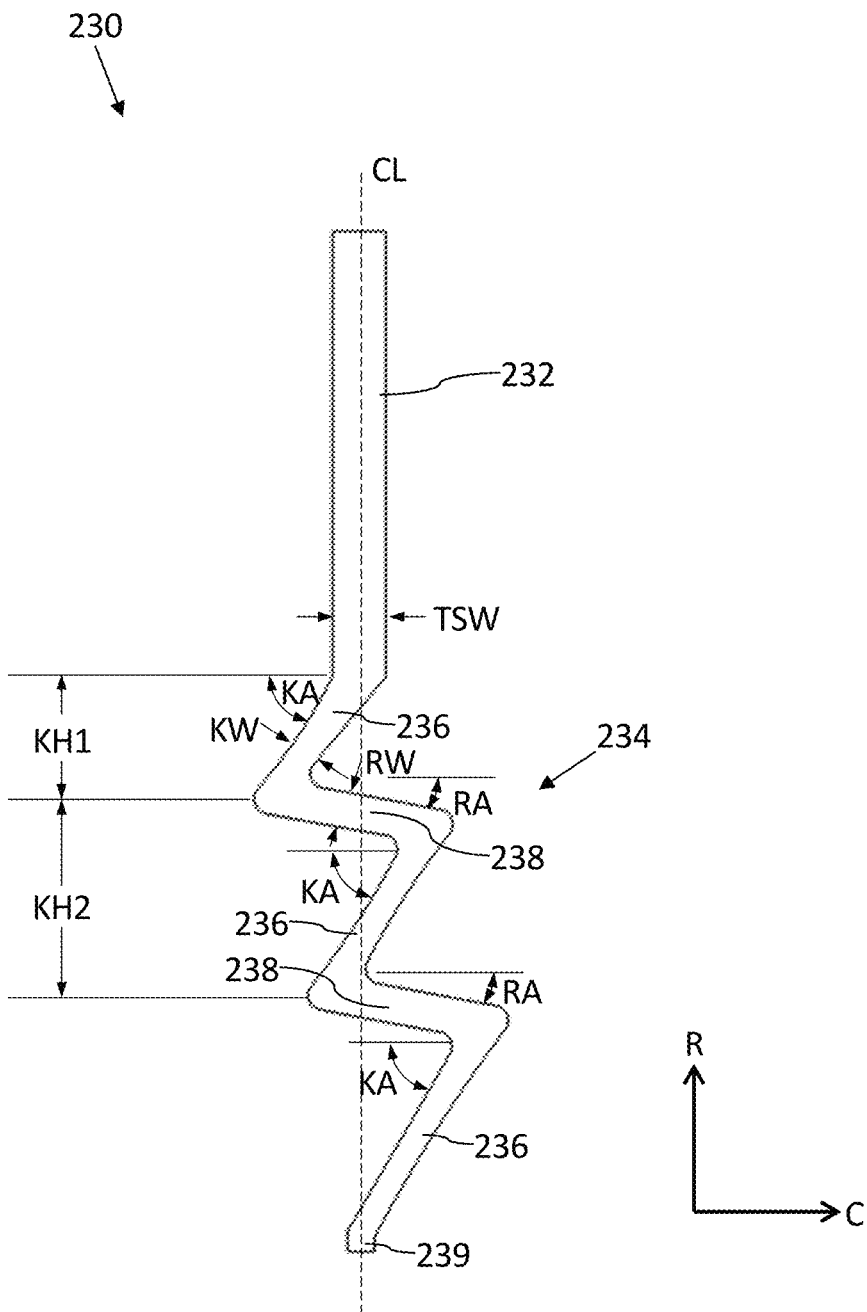
FIG. 2C illustrates an elevation sectional view of sipe blade 230 for forming a directional interlocking sipe and/or slot.

In the aspect illustrated in FIG. 2C, height KH1 may be about 1.48 mm. Height KH1 may be 1.48 mm. Height KH1 may be between about 1.25 mm and about 1.75 mm. Height KH1 may be between 1.25 mm and 1.75 mm. Height KH1 may be between about 1.00 mm and about 2.00 mm. Height KH1 may be between 1.00 mm and 2.00 mm. Height KH1 may be between about 0.75 mm and about 2.25 mm. Height KH1 may be between 0.75 mm and 2.25 mm. FIG. 2C may be, for example, a sipe blade 230 for forming a sipe and/or slot in a center rib or center block row (e.g., center row 164).

Second key portion 236 joins second return portion 238 at a second vertex that is a radial height KH2 from the first vertex.

In the aspect illustrated in FIG. 2A, height KH2 may be about 2.17 mm. Height KH2 may be 2.17 mm. Height KH2 may be between about 2.00 mm and about 2.50 mm. Height KH2 may be between 2.00 mm and 2.50 mm. Height KH2 may be between about 1.50 mm and about 3.00 mm. Height KH2 may be between 1.50 mm and 3.00 mm. Height KH2 may be between about 1.00 mm and about 3.5 mm. Height KH2 may be between 1.00 mm and 3.50 mm. The ratio of KH1 to KH2 may be about 1.27, may be 1.27, may be between about 1.20 and about 1.30, may be between 1.20 and 1.30, may be between about 1.15 and about 1.35, may be between 1.15 and 1.35, may be between about 1.10 and about 1.40, and may be between 1.10 and 1.40.

In the aspect illustrated in FIG. 2B, height KH2 may be about 2.17 mm. Height KH2 may be 2.17 mm. Height KH2 may be between about 2.00 mm and about 2.50 mm. Height KH2 may be between 2.00 mm and 2.50 mm. Height KH2 may be between about 1.50 mm and about 3.00 mm. Height KH2 may be between 1.50 mm and 3.00 mm. Height KH2 may be between about 1.00 mm and about 3.5 mm. Height KH2 may be between 1.00 mm and 3.50 mm. The ratio of KH1 to KH2 may be about 1.00, may be 1.00, may be between about 0.95 and about 1.05, may be between 0.95 and 1.05, may be between about 0.90 and about 1.10, may be between 0.90 and 1.10, may be between about 0.85 and about 1.15, and may be between 0.85 and 1.15.

In the aspect illustrated in FIG. 2C, height KH2 may be about 2.17 mm. Height KH2 may be 2.17 mm. Height KH2 may be between about 2.00 mm and about 2.50 mm. Height KH2 may be between 2.00 mm and 2.50 mm. Height KH2 may be between about 1.50 mm and about 3.00 mm. Height KH2 may be between 1.50 mm and 3.00 mm. Height KH2 may be between about 1.00 mm and about 3.5 mm. Height KH2 may be between 1.00 mm and 3.50 mm. The ratio of KH1 to KH2 may be about 0.68, may be 0.68, may be between about 0.65 and about 0.70, may be between 0.65 and 0.70, may be between about 0.60 and about 0.75, may be between 0.60 and 0.75, may be between about 0.55 and about 0.80, and may be between 0.55 and 0.80.

Sipe blade 230 terminates radially inwardly in a terminal portion 239. In one aspect, centerline CL extends through terminal portion 239. In another aspect, centerline CL may extend through terminal portion 239. Terminal portion 239 may include a circumferential width that is one half of width TSW.

Figure 2D:
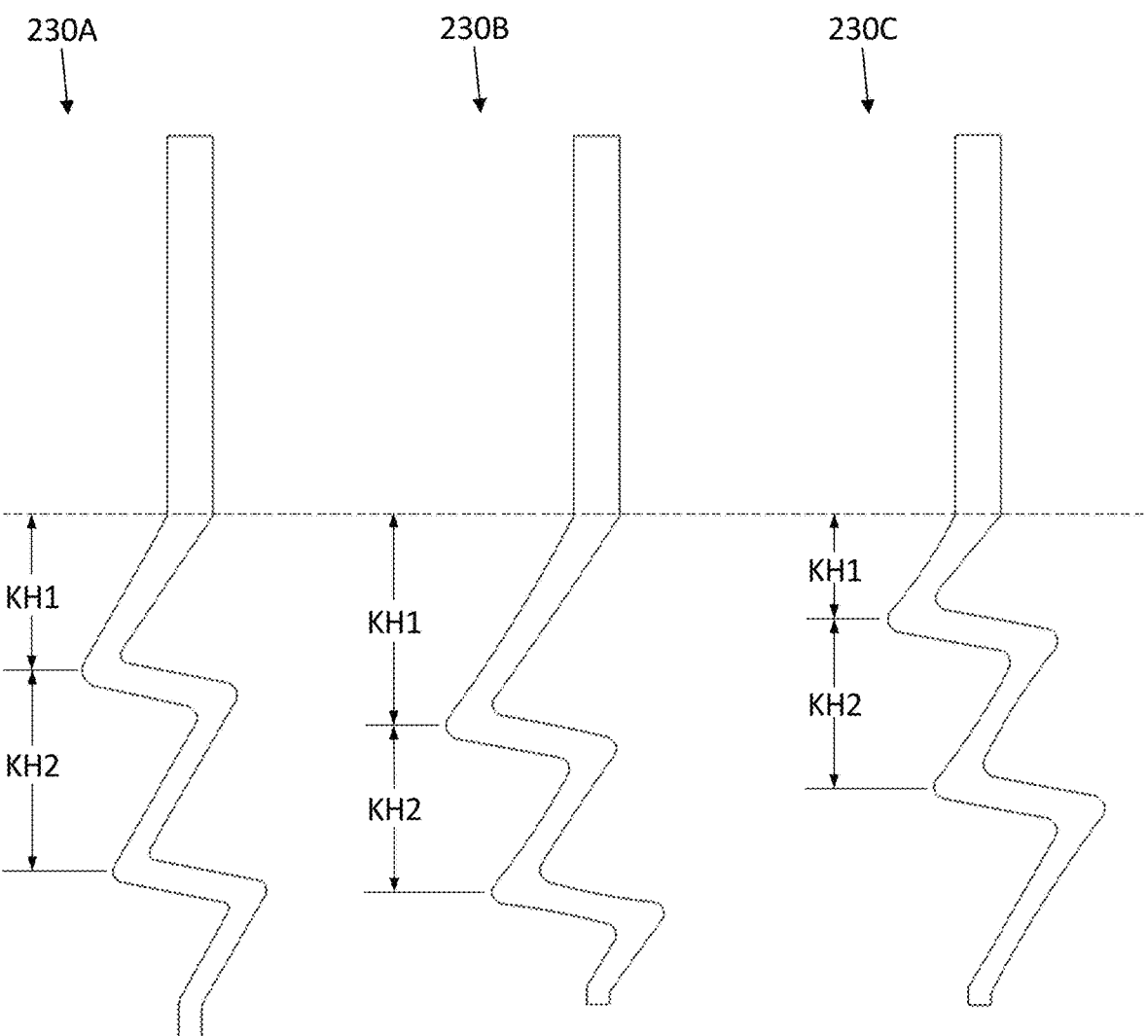
FIG. 2D illustrates an elevation sectional view of different arrangements of sipe blades 230 for forming a directional interlocking sipes and/or slots.

FIG. 2D illustrates sipe blades 230A (FIG. 2A), 230B (FIG. 2B), and 230C (FIG. 2C) in juxtaposition. The heights of the first and second vertices, and the values of KH1 and KH2 are different between each sipe blade. The key edge (e.g., key edge 350) formed in the tread by the sipe blades exists while the tread wears along key portion 236 but does not exist for the brief period that the tread wears through return portion 238. As illustrated, the sipe blades may be configured such that the heights of the first and second vertices and the values of KH1 and KH2 are offset to ensure the existence of a key edge during wear of the tire.

Figure 2E:
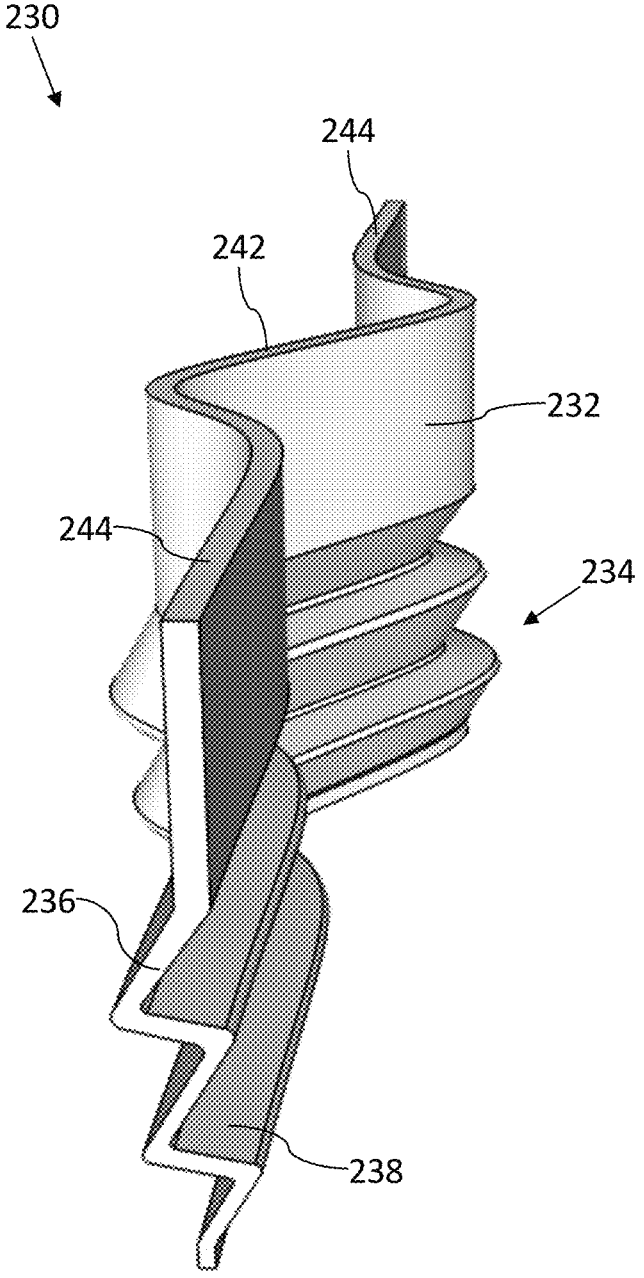
FIG. 2E illustrates a perspective view of sipe blade 230 for forming a directional interlocking sipe and/or slot.

As illustrated in FIG. 2E, sipe blade 230 may include a central s-shaped portion 242 oriented axially between laterally extending straight portions 244.

Figure 2F:
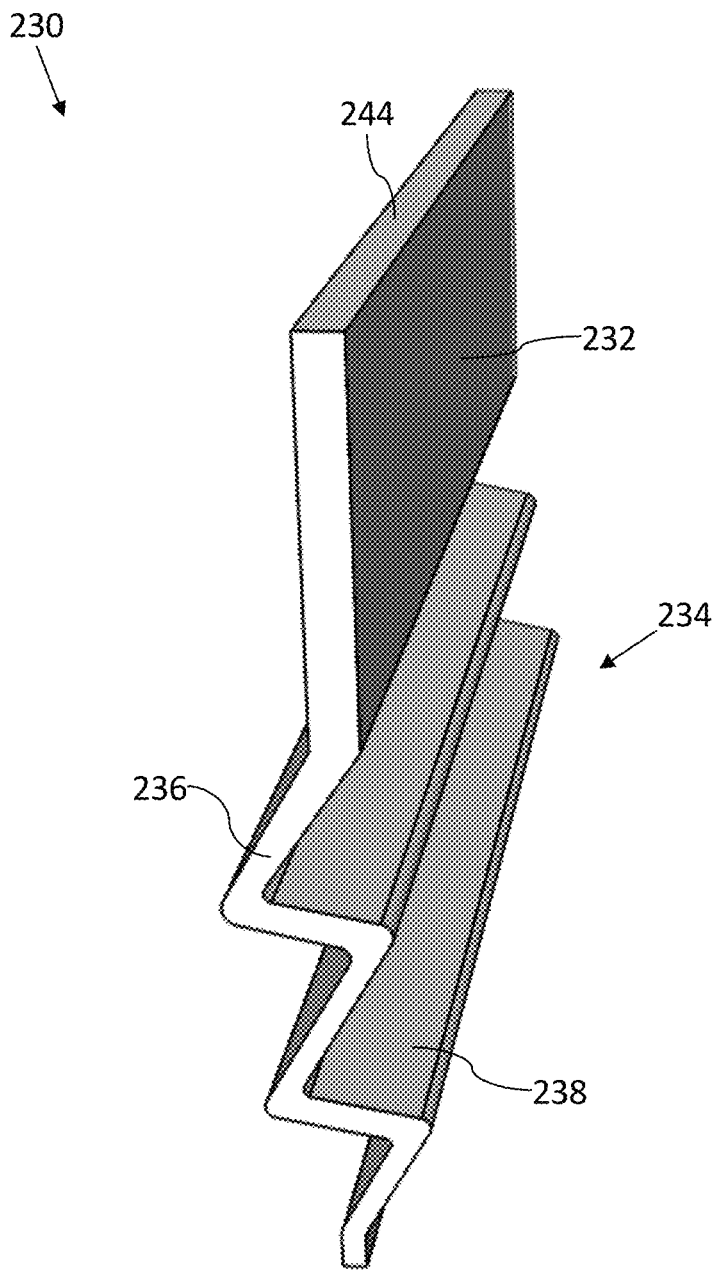
FIG. 2F illustrates a perspective view of sipe blade 230 for forming a directional interlocking sipe and/or slot.
Figure 3A:
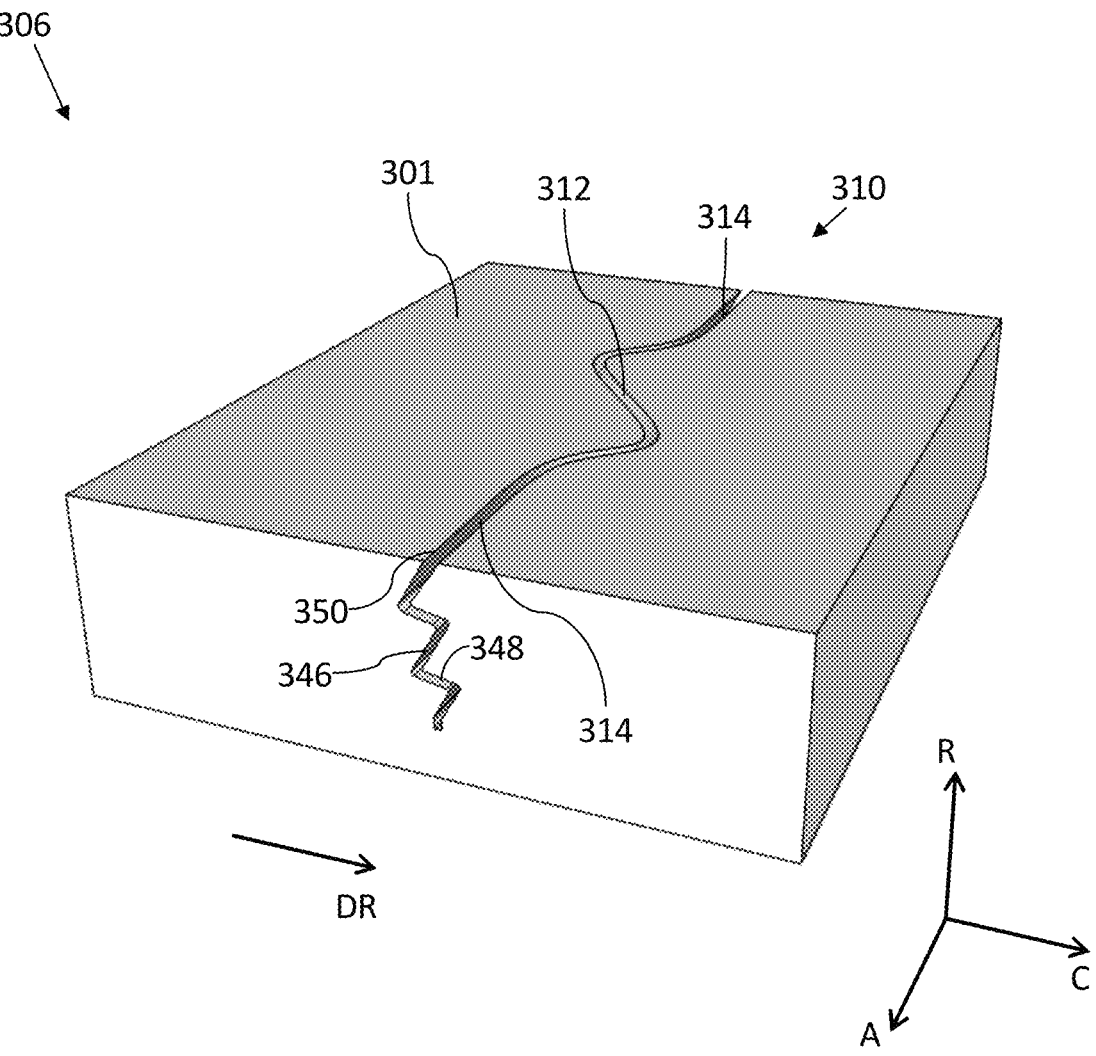
FIG. 3A illustrates a perspective view of a tread block 306 with a directional interlocking sipe and/or slot 310.
Figure 3B:
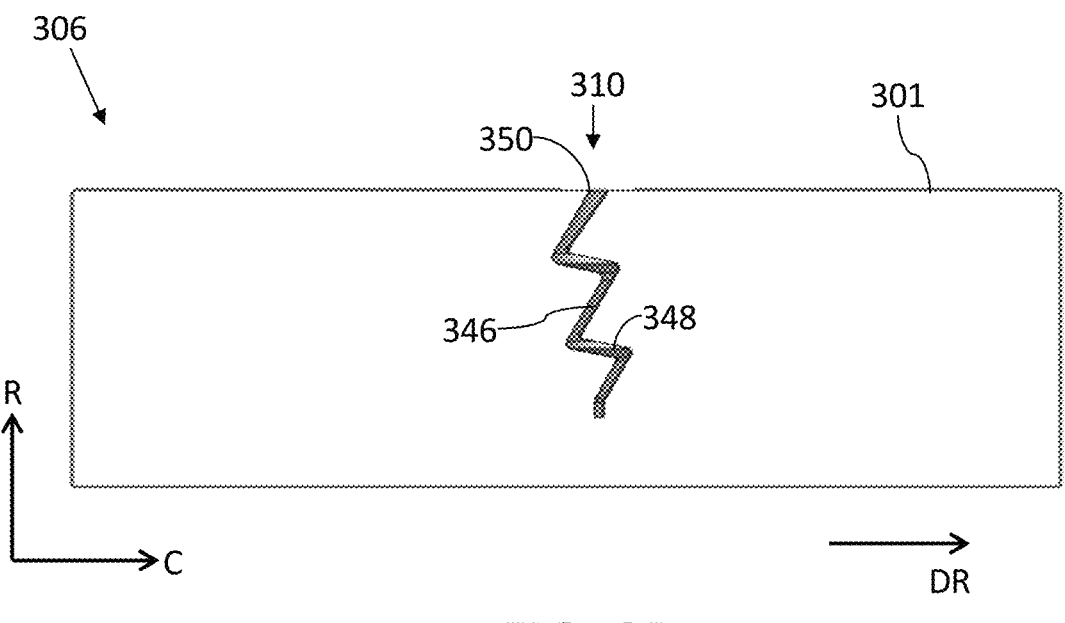
FIG. 3B illustrates an elevation view of tread block 306 with directional interlocking sipe and/or slot 310.
Figure 3C:
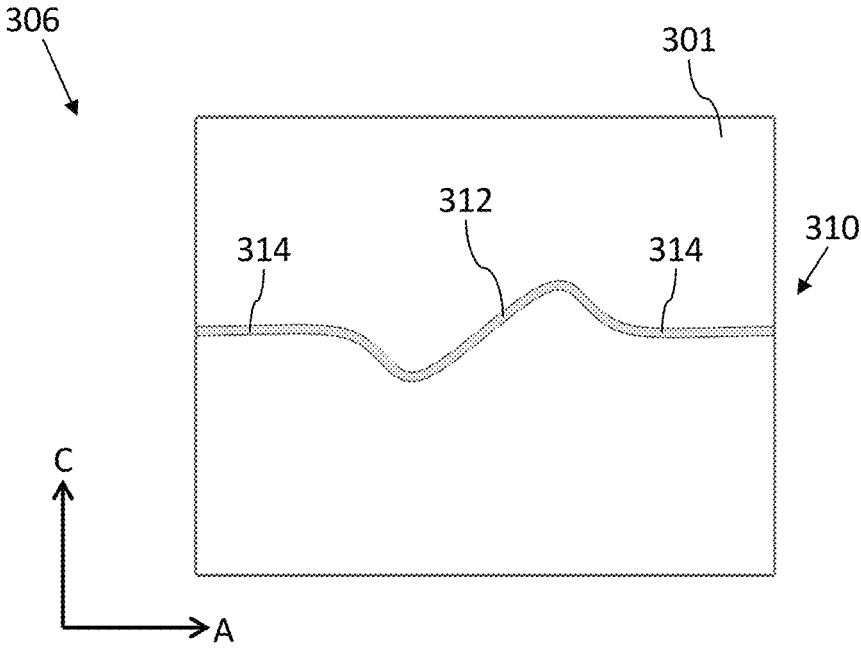
FIG. 3C illustrates a plan view of tread block 306 with directional interlocking sipe and/or slot 310.
Figure 3D:
FIG. 3D illustrates an exploded perspective view of tread block 306 with directional interlocking sipe and/or slot 310.
Figure 3D:
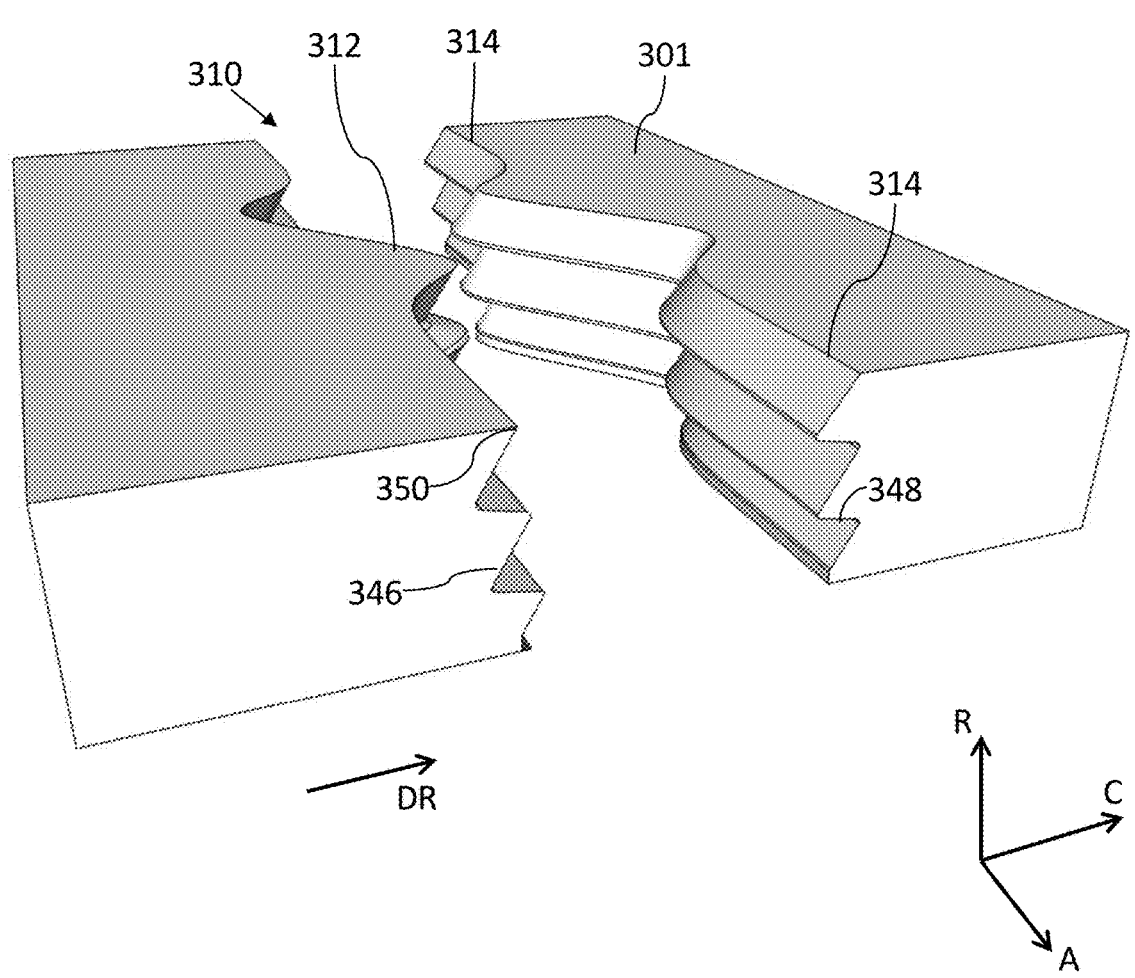
Figure 3E:
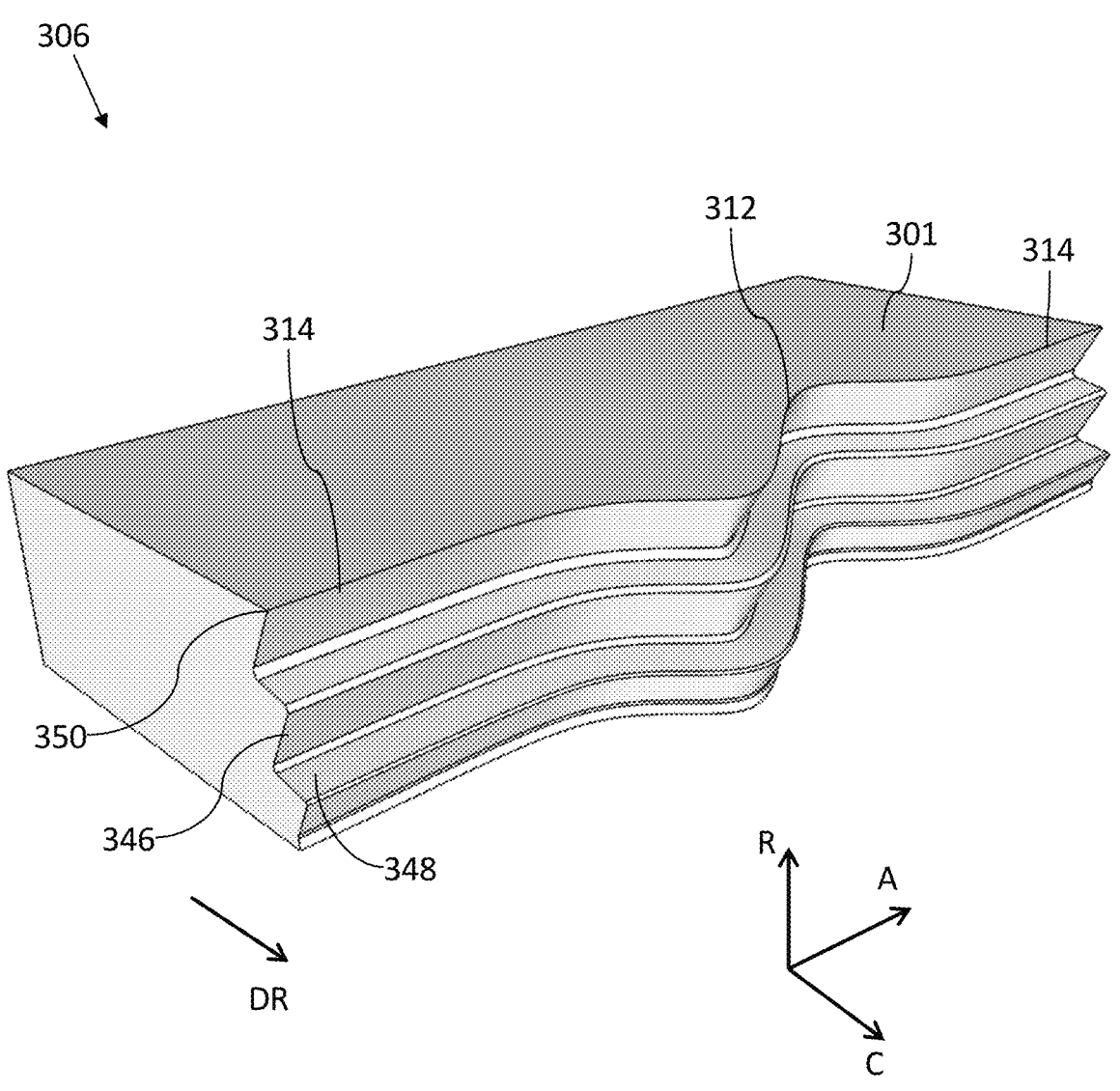
FIG. 3E illustrates a partial perspective view of tread block 306 with directional interlocking sipe and/or slot 310.

As illustrated in FIG. 2F, sipe blade 230 may include no central s-shaped portion and may include only laterally extending straight portions 244.

FIGS. 3A-3E illustrate a tread block 306 with a directional interlocking sipe and/or slot 310.

Sipe and/or slot 310 extends radially inwardly into tread block 306 from a tread surface 301. Sipe and/or slot 310 may include a central s-shaped portion 312 oriented axially between laterally extending straight portions 314. Sipe and/ or slot 310 may include only straight portions 314, as illustrated for example only in FIG. 1, shoulder rows 160 of the example tire tread 100.

Sipe and/or slot 310 includes key portions 346 and return portions 348 as described above in reference to sipe blade 230's key portions 236 and return portions 238.

Key portions 346 form a sharp (acute) key edge 350 where key portion 346 meets tread surface 301. Key edge 350 provides increased traction when tread block 306 engages a roadway in the direction of rolling DR. Key edge 350 provides increased snow and/or ice traction by increasing the friction between tread surface 301 and the snow and/or ice-covered running surface. Key edge 350 may provide increased traction benefits by "biting" into snow and ice surfaces to increase the traction on those surfaces during acceleration in direction of rolling DR. Key edge 350 forms an angle KA (as referenced above in FIGS. 2A-2C) relative to tread surface 301.

FIGS. 4A-4D illustrate a tread block 406 with a directional interlocking sipe and/or slot 410 in various stages of wear.

Figure 4A:
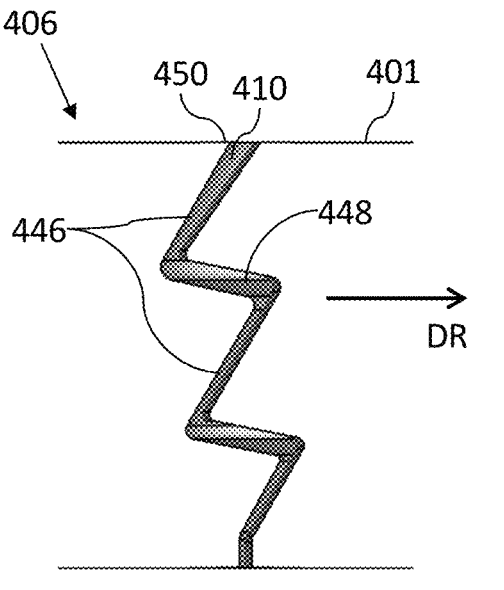
FIG. 4A illustrates a partial elevation view of a tread block 406 with a directional interlocking sipe and/or slot 410.
Figure 4B:
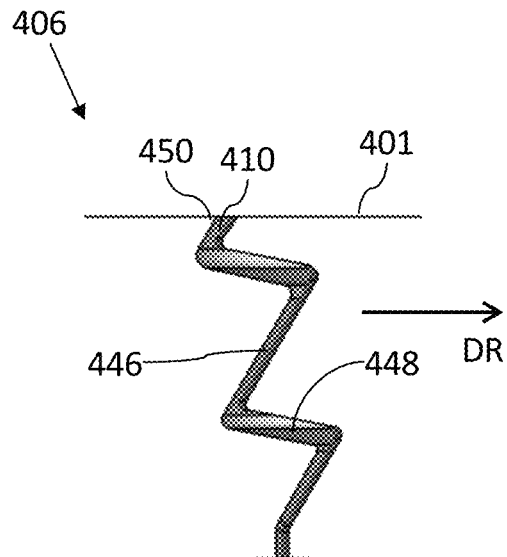
FIG. 4B illustrates a partial elevation view of tread block 406 with directional interlocking sipe and/or slot 410.

FIGS. 4A and 4B illustrate tread block 406's tread surface 401 wearing through a first key portion 446. A key edge 450 is present in these stages of wear of tread block 406. That is, as tread block 406 wears, tread surface 401 moves radially inwardly and intersects different portions of sipe and/or slot 410.

Figure 4C:
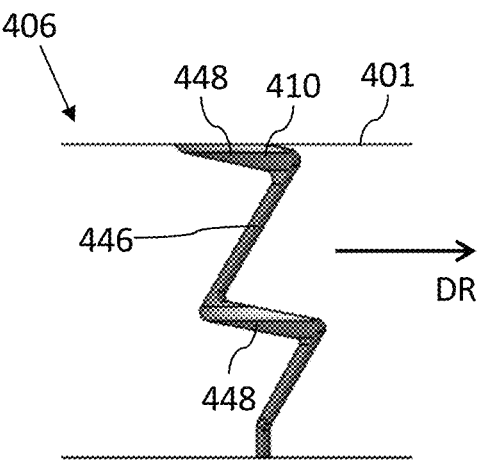
FIG. 4C illustrates a partial elevation view of tread block 406 with directional interlocking sipe and/or slot 410.

FIG. 4C illustrates tread surface 401 wearing through a first return portion 448, which does not include a key edge 450.

Figure 4D:
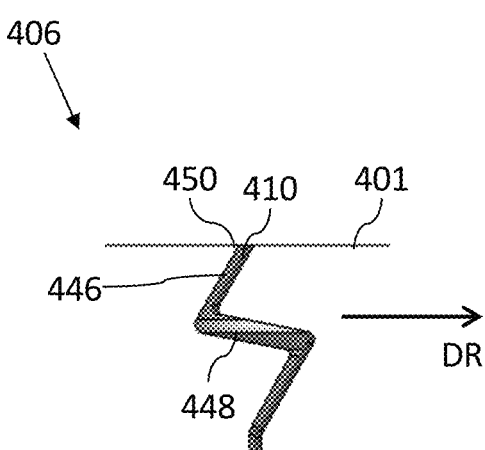
FIG. 4D illustrates a partial elevation view of tread block 406 with directional interlocking sipe and/or slot 410.

FIG. 4D illustrates tread surface 401 wearing through a second key portion 446, in which state key edge 450 is again present.

Due to the difference in the angle of key portions 446 (e.g., angle KA) and return portions 448 (e.g., angle RA), as tread surface 401 wears radially inwardly, sipe and/or slot 410 intersects tread surface 401 in key portion 446 for greater periods of that wear than in return portions 448. As illustrated, sipe and/or slot 410 includes key edge 450 while key portion 446 intersects tread surface 401.

With respect to the various aspects described above, a tire tread having a sipe and/or slot with a key edge as described herein has improved traction in snow and/or ice versus tire tread lacking such a feature. Tread having the key edge described herein may have an increased snow traction benefit in the forward direction (accelerating) of rolling DR relative to a standard snow tire. Alternatively, the key edge described may have an increased snow traction benefit in the rearward direction (braking) of rolling DR relative to a standard snow tire, depending upon the orientation of the sipe and/or slot.

Prior art designs sought to increase snow traction through tread patterns having a very high lateral edge density and void patterns (that is, extending in the axial direction), which results in decreased dry roadway performance. The sipe and/or slots described herein significantly increase snow performance and allow for tread pattern modifications to reduce lateral edge density, thus reducing and/or eliminating detrimental effects to dry performance. The result is a tread pattern with the aforementioned sipes and/or slots with additional snow performance and dry performance compared to a tread pattern without the aforementioned sipes and/or slots. Additionally, with the differing values of KH1 and KH2 between various sipes and/or slots, the improved snow traction may be present at any wear state of the tread pattern.

Additionally, the alternating shape of key portions and return portions of the sipes and/or slots described herein create interlocking sipe sidewalls that self-contact (interlock) under braking, acceleration, and lateral maneuvers. This interlocking aspect of the tread block may act to increase block rigidity under braking, acceleration, and/or lateral maneuvers.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available in tire manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments and aspects thereof, and while the embodiments and aspects have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. A tire comprising:
a tread portion comprising at least one of a tread rib or a tread block,
a sipe included in the tread rib or the tread block,
wherein the sipe includes a plurality of key portions angled in a first circumferential direction at an angle KA from the circumferential direction tangential to a tread surface,
wherein the sipe includes a plurality of return portions angled in a second circumferential direction at an angle RA from the circumferential direction tangential to the tread surface,
wherein the return portions connect the key portions,
wherein a first key portion intersects the tread surface of the tread rib or the tread block, and wherein the ratio of the angle KA to the angle RA is at least 5:1.

2. The tire of claim 1, wherein the ratio of the angle KA to the angle RA is between 5:1 and 6:1.

3. The tire of claim 1, wherein the sipe includes a central s-shaped portion located axially between opposing laterally extending straight portions.

4. The tire of claim 1, wherein each key portion has a width KW, each return portion has a width RW, and wherein the ratio of the width KW to the width RW is 3:4.

5. The tire of claim 1, wherein the sipe has a radially outermost tread surface sipe width TSW, wherein the sipe has a radially innermost terminal portion having a circumferential width, and wherein the terminal portion circumferential width is one half of the width TSW.

6. The tire of claim 1, wherein the first key portion intersects the tread surface to form a key edge.

7. The tire of claim 1, further comprising a sipe including no central s-shaped portion only laterally extending straight portions, wherein the sipe includes a plurality of key portions angled in a first circumferential direction, wherein the sipe includes a plurality of return portions angled in a second circumferential direction, wherein the return portions connect the key portions, and wherein a first key portion intersects a tread surface of the tread rib or the tread block.

8. A tire sipe blade comprising:
an upper mold insertion portion,
a lower sipe forming portion including:
a plurality of key portions angled in a first circumferential direction at an angle KA,
a plurality of return portions angled in a second circumferential direction at an angle RA,
wherein the return portions connect the key portions,
wherein a first key portion connects to the upper mold insertion portion, and
wherein the ratio of the angle KA to the angle RA is at least 5:1.

9. The tire sipe blade of claim 8, wherein the ratio of the angle KA to the angle RA is between 5:1 and 6:1.

10. The tire sipe blade of claim 8, wherein the tire sipe blade includes a central s-shaped portion located axially between opposing laterally extending straight portions.

11. The tire sipe blade of claim 8, wherein each key portion has a width KW, each return portion has a width RW, and wherein the ratio of the width KW to the width RW is 3:4.

12. The tire sipe blade of claim 8, wherein the tire sipe blade has a radially outermost tread surface sipe width TSW, wherein the tire sipe blade has a radially innermost terminal portion having a circumferential width, and wherein the terminal portion circumferential width is one half of the width TSW.

13. The tire sipe blade of claim 12, wherein the upper mold insertion portion has a centerline CL, and wherein the centerline CL extends through the terminal portion.

14. A tire comprising:
a tread portion comprising at least one of a tread rib or a tread block,
a sipe included in the tread rib or the tread block,
wherein the sipe includes a plurality of key portions angled in a first circumferential direction,
wherein the sipe includes a plurality of return portions angled in a second circumferential direction,
wherein the return portions connect the key portions,
wherein a first key portion intersects a tread surface of the tread rib or the tread block, and wherein each key portion has a width KW, each return portion has a width RW, and wherein the ratio of the width KW to the width RW is 3:4.

15. The tire of claim 14, wherein the sipe has a radially outermost tread surface sipe width TSW, wherein the sipe has a radially innermost terminal portion having a circumferential width, and wherein the terminal portion circumferential width is one half of the width TSW.

16. The tire of claim 14, wherein the first key portion intersects the tread surface to form a key edge.

17. The tire of claim 14, further comprising a sipe including laterally extending straight portions, wherein the sipe includes a plurality of key portions angled in a first circumferential direction, wherein the sipe includes a plurality of return portions angled in a second circumferential direction, wherein the return portions connect the key portions, and wherein a first key portion intersects a tread surface of the tread rib or the tread block.

18. The tire of claim 14, wherein the plurality of key portions are angled at an angle KA from the circumferential direction tangential to the tread surface, wherein the plurality of return portions are angled at an angle RA from the circumferential direction tangential to the tread surface, and wherein the ratio of the angle KA to the angle RA is at least 5:1.

19. The tire of claim 18, wherein the ratio of the angle KA to the angle RA is between 5:1 and 6:1.

* * * * *